United States Patent

Masutani

[11] Patent Number: 5,847,810
[45] Date of Patent: Dec. 8, 1998

[54] PHOTOGRAPHIC PROCESSING APPARATUS

[75] Inventor: Hironori Masutani, Wakayama, Japan

[73] Assignee: Noritsu Koki Co., Ltd, Wakayama-ken, Japan

[21] Appl. No.: 925,307

[22] Filed: Sep. 8, 1997

[30] Foreign Application Priority Data

Sep. 10, 1996 [JP] Japan .................................. 8-238821
Sep. 17, 1996 [JP] Japan .................................. 8-244956

[51] Int. Cl.$^6$ .................................................. G03B 27/52
[52] U.S. Cl. ................................ 355/27; 355/40; 355/77
[58] Field of Search ................................. 355/40, 41, 72, 355/77, 27–29

[56] References Cited

U.S. PATENT DOCUMENTS 4,574,692 3/1986 Wahli ........................................ 355/40

FOREIGN PATENT DOCUMENTS

136980A 4/1985 European Pat. Off. ....... G03D 15/00
643622 2/1994 Japan .

Primary Examiner—D. Rutledge
Attorney, Agent, or Firm—Fulbright & Jaworski, LLP

[57] ABSTRACT

A discharge bypass line 200 is formed for forcibly discharging printing paper 3 from a print transport line extending from a paper cutter 51 to a collating station 74. A no-cut discharge control device 5f discharges the printing paper 3 fed to the paper cutter 51 to the discharge bypass line 200 without cutting the printing paper, in response to a signal from a print transport trouble detecting device 5g for detecting a print transport disrupting trouble occurring in the print transport line.

6 Claims, 9 Drawing Sheets

C.U.=CONTROL UNIT
D.U.= DETECTING UNIT

PHOTOGRAPHIC PROCESSING APPARATUS

BACKGROUND OF THE INVENTION

1. Field of the Invention

This invention relates to a photographic processing apparatus having an exposing section for printing images of negative films on printing paper, a negative film outlet for discharging the negative films used in the exposing section, a developing section for developing the printing paper printed, a paper cutter for cutting the printing paper developed, to form prints having a predetermined length, a print outlet for discharging the prints, and a collating station for collating the negative films discharged unit by unit from the negative film outlet and the prints discharged unit by unit from the print outlet.

2. DESCRIPTION OF THE RELATED ART

In the photographic processing apparatus noted above, a combination of negative films and prints processed as one unit usually is based on a single length of negative film or one set of piece negatives (cut negative films each having four or six frames) ordered by a customer. This one unit is called one order also. When the same customer orders printing of several negative films or several sets of piece negatives at the same time, they are processed as separate orders. A photographic processing apparatus for collating piece negatives (one long negative film ultimately being cut to piece negatives of a predetermined length) and prints in one order or unit and automatically putting the negatives and prints in a product packet is known from Japanese Patent Publication Kokai No. H6-43622, for example. This photographic processing apparatus includes a collating station for collating piece negatives and prints. At the collating station, piece negatives in one unit inserted into negative sheets after an exposing process are put into a print packet printed with an ID number of these piece negatives. The ID number on the print packet is compared with ID numbers of prints transported unit by unit by a sorter. The prints in one unit having the same ID number are put into this print packet to be combined with the piece negatives having this ID number.

In such a photographic processing apparatus, cut prints (i.e. each print being cut from printing paper developed, and having a frame image) are successively transported to the collating station. The transport of the printing paper passing through developing tanks in the developing section cannot be stopped even when the prints cannot be transported owing to a breakdown of the transport device or an overflow in a collating operation at the collating station. The printing paper forwarded to the paper cutter is cut as it is, and the prints are discharged from the print outlet. Consequently, overflowing prints mix with the prints in a preceding order, which results in a collating disagreement for a considerable number of orders.

SUMMARY OF THE INVENTION

The object of this invention is to provide a photographic processing apparatus which overcomes the disadvantages of the prior art noted above, and which realizes handling of developed printing paper not affecting prints in a preceding order while continuing transport of printing paper through developing tanks in a developing section even if a print transport disrupting trouble occurs in a print transport line from a paper cutter to a collating station.

The above object is fulfilled, according to this invention, by a photographic processing apparatus having an exposing section for printing images of negative films on printing paper, a negative film outlet for discharging the negative films used in the exposing section, a developing section for developing the printing paper printed, a paper cutter for cutting the printing paper developed, to form prints having a predetermined length, a print outlet for discharging the prints, and a collating station for collating the negative films discharged unit by unit from the negative film outlet and the prints discharged unit by unit from the print outlet, in which a discharge bypass line is provided for forcibly discharging the printing paper; and no-cut discharge control means discharges the printing paper fed to the paper cutter to the discharge bypass line without cutting the printing paper, in response to a signal from a print transport trouble detecting means for detecting a print transport disrupting trouble occurring in a print transport line extending from the paper cutter to the collating station.

In the above construction, when a print transport disrupting trouble occurs in the print transport line extending from the paper cutter to the collating station, the printing paper is not cut into prints but is forcibly discharged through the discharge bypass line before being discharged from the print outlet. The printing paper fed to the paper cutter after detection of the print transport disrupting trouble never mixes with prints in a preceding order. In addition, the printing paper is discharged in an elongate form through the discharge bypass line without being cut into prints each having a frame image. Thus, there is no possibility of the printing paper scattering around as in the case of cut prints stacked in a random way.

In a preferred embodiment of this invention, the print transport line includes a tray conveyer for transporting, as one group, negative films in one unit discharged from the negative film outlet, and prints in the one unit discharged from the print outlet, and the print transport trouble detecting means detects the print transport disrupting trouble based on an interruption of transport by the tray conveyer. This construction enables automatic collation since negative films and prints in one unit which are to be combined are loaded on a tray. If the tray stops moving owing to some trouble, the prints could be scattered around the tray and a device for transferring the prints to the tray. To avoid such a situation, the paper cutter is stopped operating and the printing paper is directed into the discharge bypass line without being cut immediately upon detection of a stoppage of the tray conveyer. Thus, the emergency processing according to this invention is particularly important where this tray conveyer enabling automatic collation is employed.

In a further preferred embodiment of this invention, the discharge bypass line is disposed downstream of the paper cutter with respect to a direction of transport. In this case, a leading end of cut printing paper has only to be directed into the discharge bypass line in time of a print transport disrupting trouble. When the printing paper fed into the discharge bypass line becomes unduly long, the printing paper may be cut once by the paper cutter. Where the discharge bypass line is disposed upstream of the paper cutter with respect to the direction of transport, an additional cutter is required for use in an emergency operation.

It is proposed in this invention that the timing of cutting the elongate printing paper fed into the discharge bypass line be determined by using units of orders. That is, the uncut printing paper fed into the discharge bypass line has a length corresponding to one order. This is realized in one embodiment of this invention in which the printing paper defines cut notches dividing each frame image, and order notches dividing each order, the no-cut discharge control means being operable to permit cutting of the printing paper fed to the discharge bypass line when the order notches are detected. Consequently, a subsequent recovery operation may be carried out easily since the elongate printing paper discharged without being cut is divided into units convenient to a collating operation.

In a further preferred embodiment of this invention, it is proposed that the no-cut discharge control means is operable to switch from a no-cut discharge process to a print cutting process when the order notches are detected. When switching is made from a no-cut discharge process to a print cutting process after a print transport disrupting trouble is eliminated, print cutting is resumed upon detection of an order notch. Thus, after the print transport disrupting trouble is eliminated, prints cut are loaded on the trays, starting with a new order, which is convenient to the collating operation at the collating station.

Other features and the advantages of this invention will be apparent from the following description of the embodiments to be taken with reference to the drawing.

DESCRIPTION OF THE PREFERRED EMBODIMENTS

Figure 1:
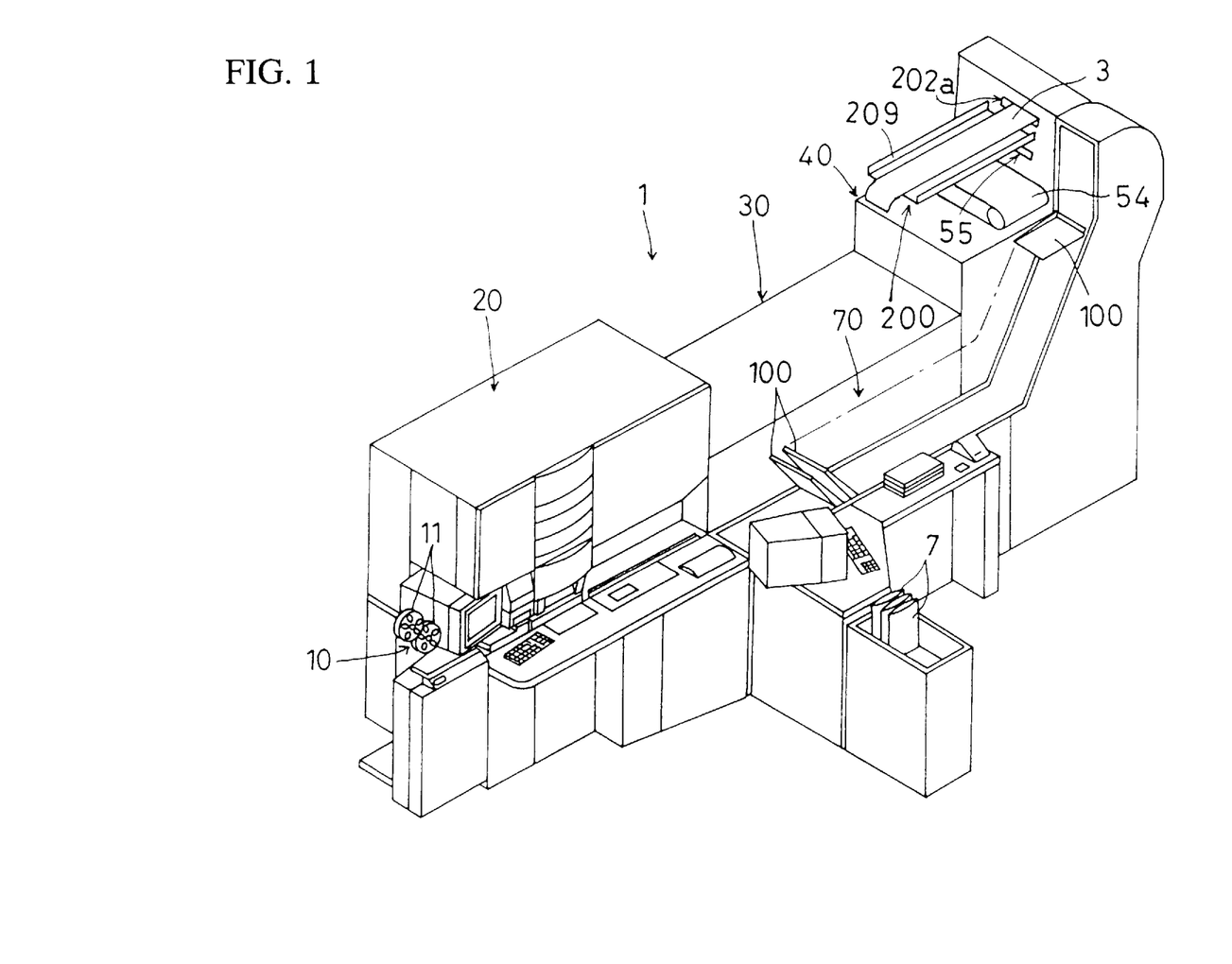
FIG. 1 is a perspective view of a photographic processing apparatus according to this invention.
Figure 2:
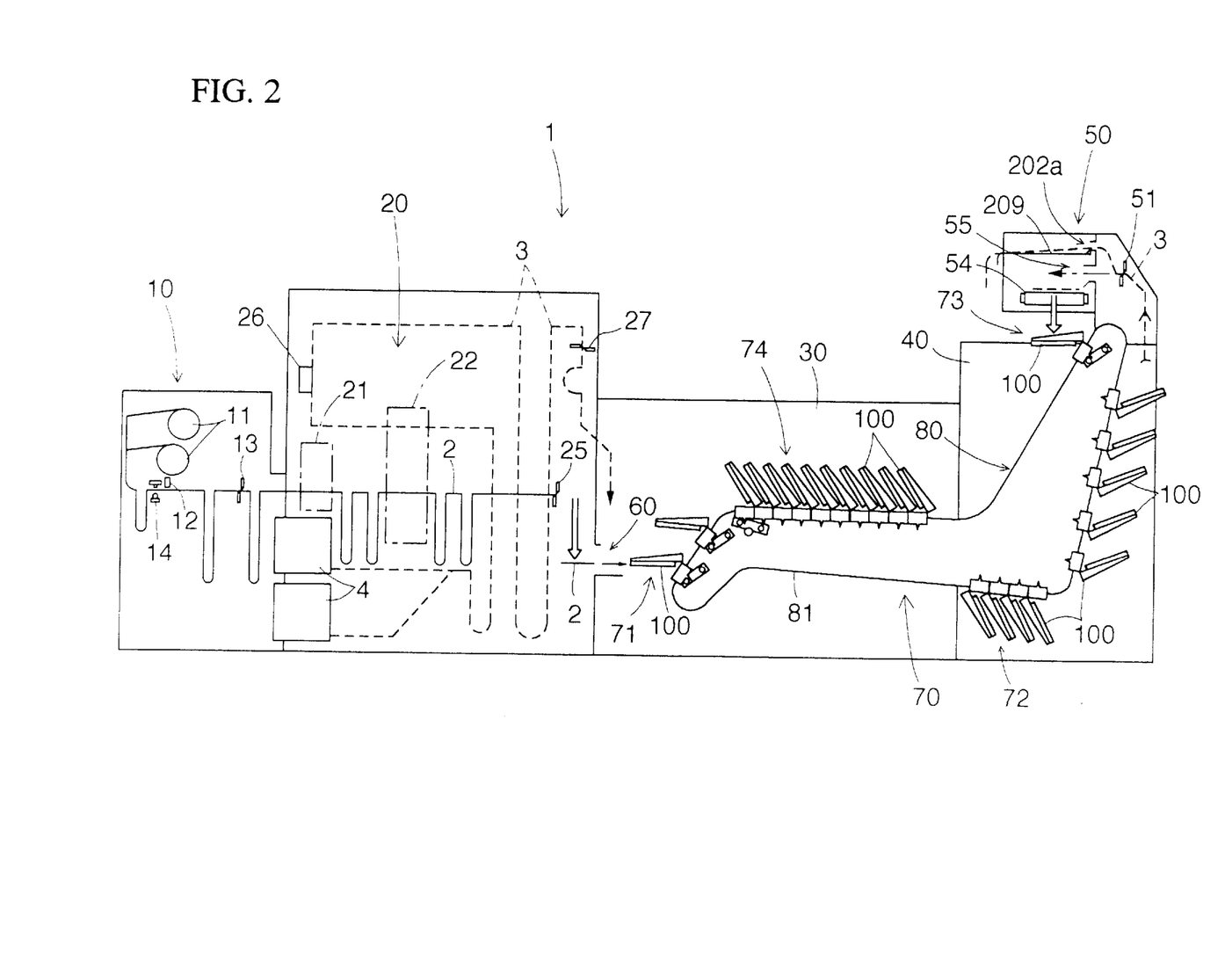
FIG. 2 is a schematic view of the photographic processing apparatus showing flows of negative films and printing paper in the apparatus of FIG. 1.

FIG. 1 shows an entire photographic processing apparatus 1 according to this invention. FIG. 2 schematically shows transport paths of a negative film 2 (the term negative film being used herein to refer collectively to a negative film having a length of one photographic film, cut piece negatives each having several frames, and a negative film in a cartridge designed for an advanced photo system) and printing paper 3 undergoing varied processes in the photographic processing apparatus 1. This photographic processing apparatus 1 includes a negative film feeder 10, an exposing section 20 for printing images of the negative film 2 on the printing paper 3 drawn from a paper magazine 4, a developing section 30 for developing the exposed printing paper 3, a drying section 40 for drying the developed printing paper 3, a print outlet 50 for cutting and discharging the dried printing paper 3 in predetermined lengths as prints, a negative film outlet 60 for cutting and discharging the negative film 2 used in the exposing section 20, with negative sheets inserted as necessary, and a conveyer mechanism 70 for collating and combining, as a finished product, the cut negative films 2 in one unit (which may be regarded as one order to facilitate understanding) received from the negative film outlet 60 and the prints in the one unit received from the print outlet 50, and transporting the finished product to a position for collection by the operator.

The negative film feeder 10 may be loaded with two negative reels 11 each having up to 100 negative films 2 connected by splicing tape. A bar-code reader 12 reads bar codes on the negative films 2 drawn from either negative reel 11. A negative cutter 13 cuts the negative films 2 order by order. An image sensor 14 is provided to check frame images on the negative films 2.

Figure 3:
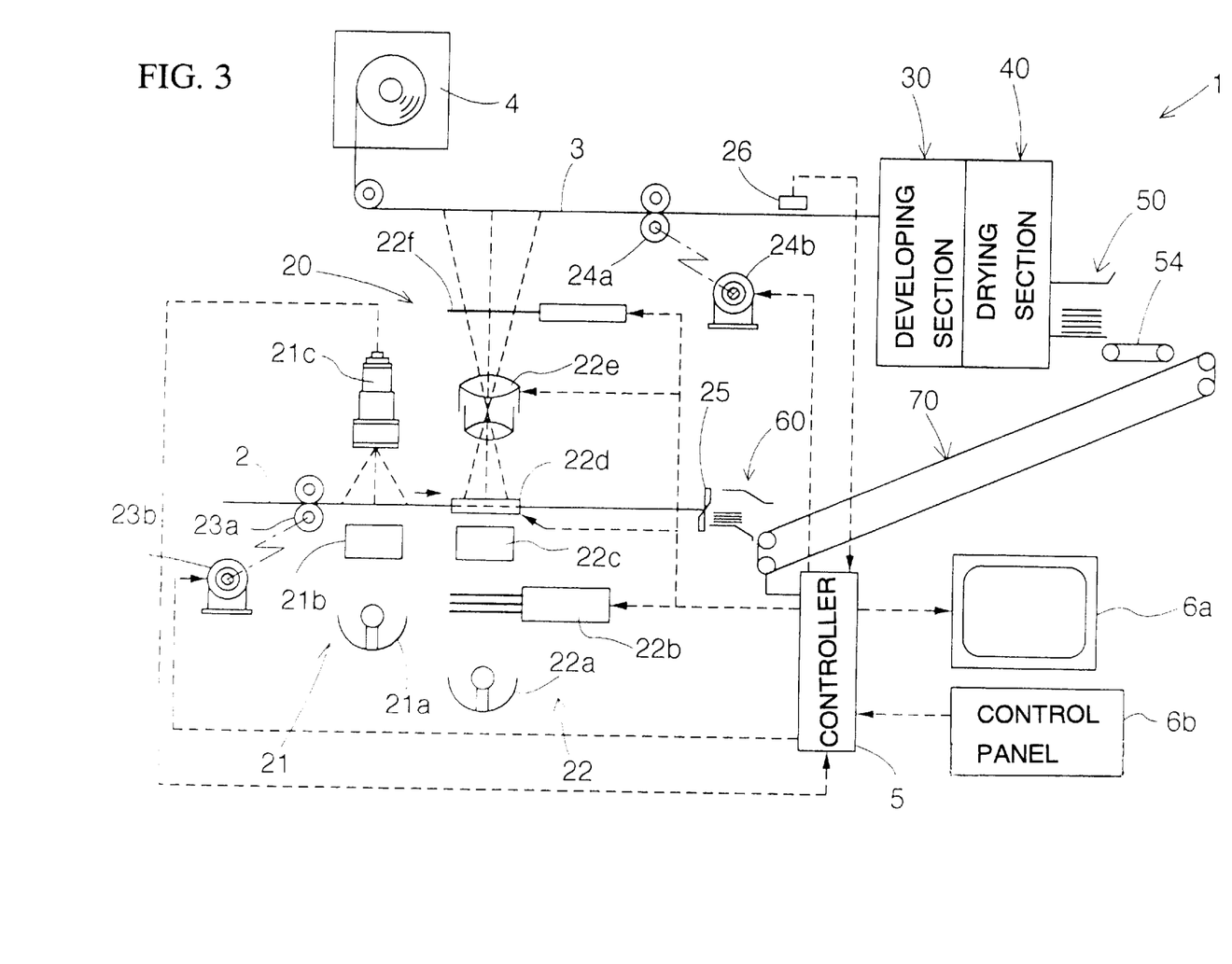
FIG. 3 is a block diagram of the photographic processing apparatus shown in FIG. 1.

As shown in FIG. 3 (in which the vertical arrangement of negative film 2 and printing paper 3 is inverted from FIG. 2), the exposing section 20 includes a film reader 21 disposed upstream with respect to a direction of film transport and having a reading light source 21a, a mirror tunnel 21b and an image pickup 21c, and an exposing device 22 disposed downstream with respect to the film transport direction and having an exposing light source 22a, a light adjustment filter 22b, a mirror tunnel 22c, a negative mask 22d, a printing lens 22e and a shutter 22f. Rollers 23a and a motor 23b for driving the rollers 23a are provided to transport the negative film 2 from the negative film feeder 10 through the exposing section 20 to the negative outlet 60.

Figure 4:
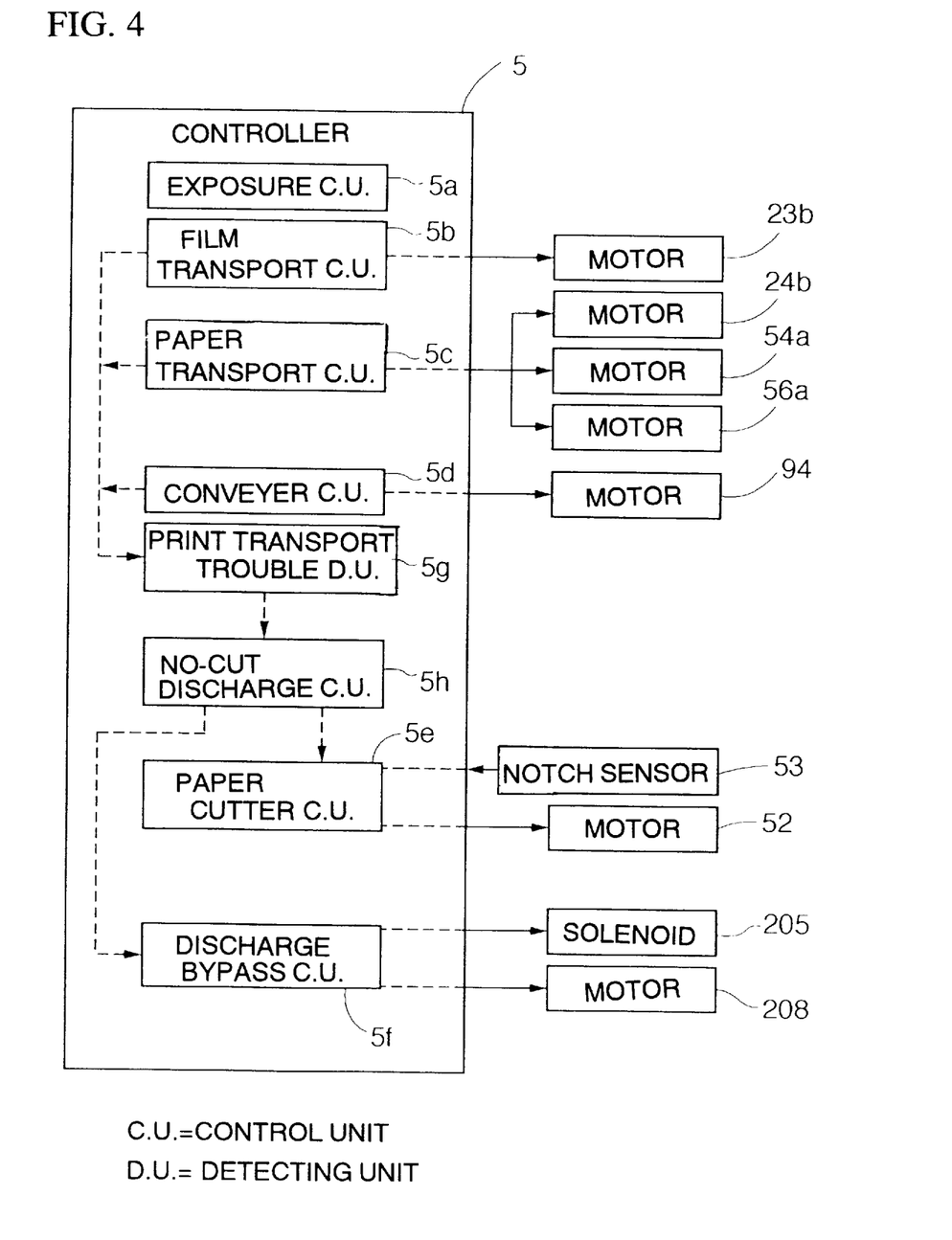
FIG. 4 is a block diagram of a controller.

First, the film reader 21 reads the image of each frame on the negative film 2 transported by the rollers 23a, and transmits image information to a controller 5 which is illustrated in detail in the block diagram of FIG. 4. From the image information received from the film reader 21, an exposure control unit 5a of the controller 5 derives exposing conditions for printing the images of the negative film 2 on the printing paper 3. The exposure control unit 5a controls the light adjustment filter 22b and shutter 22f based on the exposing conditions derived to expose the printing paper 3 when the corresponding frame on the negative film 2 arrives at the position of negative mask 22d. In addition, the controller 5 processes the image information of the negative film 2 read by the film reader 21, and causes a monitor 6a to display simulations of images to be printed on the printing paper 3 with the exposing conditions derived. The operator may observe the simulated images displayed on the monitor 6a, and correct the exposing conditions through a control panel 6b as necessary.

The negative film 2 emerging from the exposing section 20 is cut to a plurality of negative pieces 2 each having six or four frames by a negative cutter 25 in the negative film outlet 60 disposed downstream of the exposing device 22 with respect to the film transport direction. The negative pieces 2 are delivered to the conveyer mechanism 70. Depending on specifications, the negative pieces 2 may be inserted into negative sheets by a negative inserter not shown, the negative sheets being folded before delivery to the conveyer mechanism 70. The negative film 2 designed for an advanced photo system is drawn out of the cartridge before the varied processes, and rewound into the cartridge again after the processes. This type of negative film 2 after the exposing process is delivered to the conveyer mechanism 70 as contained in the cartridge. The negative film 2 is drawn from the negative reel 11 and ultimately transported to the conveyer mechanism 70 under control of a negative film transport control unit 5b of the controller 5.

The developing section 30 includes a plurality of developing tanks not shown. The printing paper 3, with the images of the negative film 2 printed thereon in the exposing section 20, is transported by rollers 24a and a motor 24b for driving the rollers 24a, through a correction print unit 26, and successively through the developing tanks in the developing section 30 to be developed. A cutter 27 is disposed upstream of the developing section 30 for cutting the printing paper 3 in an emergency, e.g. when the printing paper 3 cannot be fed from the exposing section 20 to the developing section 30 despite the presence of a loop.

The developed printing paper 3 is dried in the drying section 40 and forwarded to the print outlet 50, where the paper 3 is cut by a paper cutter 51 to become finished prints 3. The prints 3 are delivered by a transverse conveyer 54 driven by a motor 54a to the conveyer mechanism 70.

Numeral 200 denotes a discharge bypass line for discharging the printing paper 3 to a separate location without being cut in the event of a print transport disrupting trouble in a print transport line extending from the paper cutter 51 through the transverse conveyer 54 to the conveyer mechanism 70. This forcible discharge is carried out, discontinuing the operation to cut the printing paper 3 and feed it to the transverse conveyer 54. As shown in detail in FIG. 5, the discharge bypass line 200 is defined by a frame 201 disposed above a print transport path formed by drive rollers 56 driven by a motor 56a and a guide plate 57 arranged between the paper cutter 51 and a discharge opening 55 to the transverse conveyer 54. The frame 201 defines a through path 202 extending obliquely upward and horizontally again and having an opening 202a located above the guide plate 57. In the region of this opening 202a is disposed a path switch member 204 pivotable about a pivot axis 203. The path switch member 204 is driven by a solenoid 205. The through path 202 includes a plurality of transport roller sets each consisting of a drive roller 206 and an idle roller 207 opposed to the drive roller 206, for forcibly transporting the printing paper 3 entering the through path 202 to an uncut printing paper table 209 extending above the transverse conveyer 54. The drive rollers 206 are driven by a motor 208.

Figure 6:
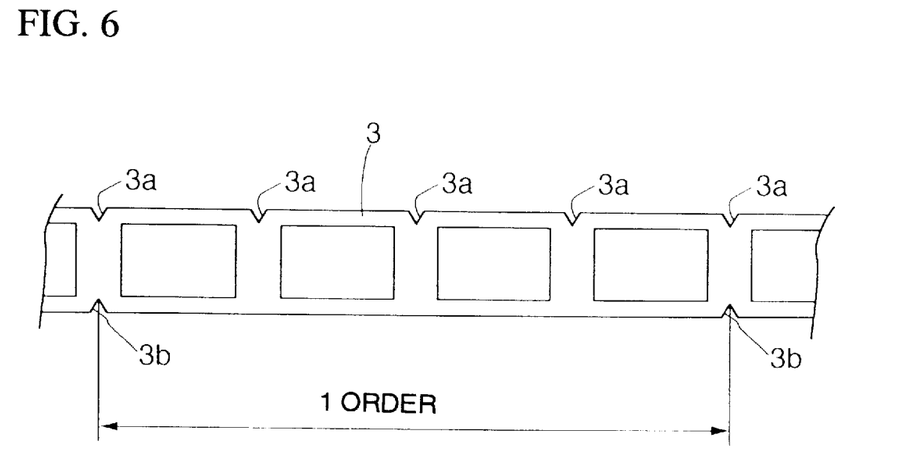
FIG. 6 is an explanatory view of printing paper defining cut notches and order notches.

The paper cutter 51 is vertically driven by a motor 52 through an eccentric cam mechanism, not shown, to perform a cutting operation. A notch sensor 53 is disposed upstream of the paper cutter 51 with respect to the direction of transport, for determining timing of cutting the printing paper 3. As shown in FIG. 6, the printing paper 3 has cut notches 3a representing divisions for frame images, and order notches 3b representing divisions for orders each including a plurality of frame images. These notches are formed by a notcher not shown. The notch sensor 53 optically detects the cut notches 3a and order notches 3b, and transmits detection signals to the controller 5.

The printing paper 3 drawn from the paper magazine 4 is cut by the paper cutter 51, and transported from the transverse conveyer 54 to the conveyer mechanism 70. This transport of the printing paper 3 and print 3 is controlled by a paper transport control unit 5c of the controller 5.

Figure 7:
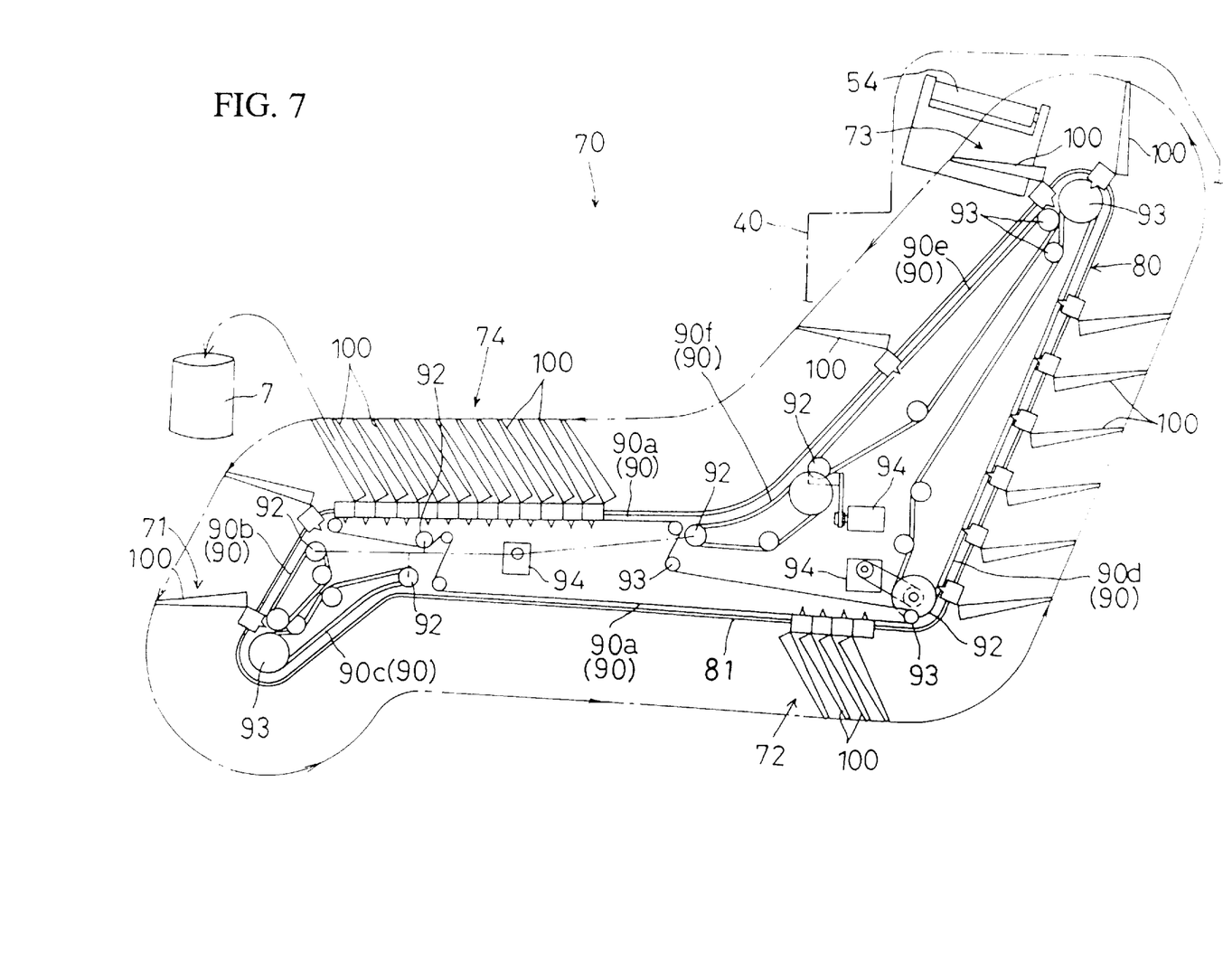
FIG. 7 is a schematic view of a conveyer mechanism forming part of a photograph collating system.
Figure 8:
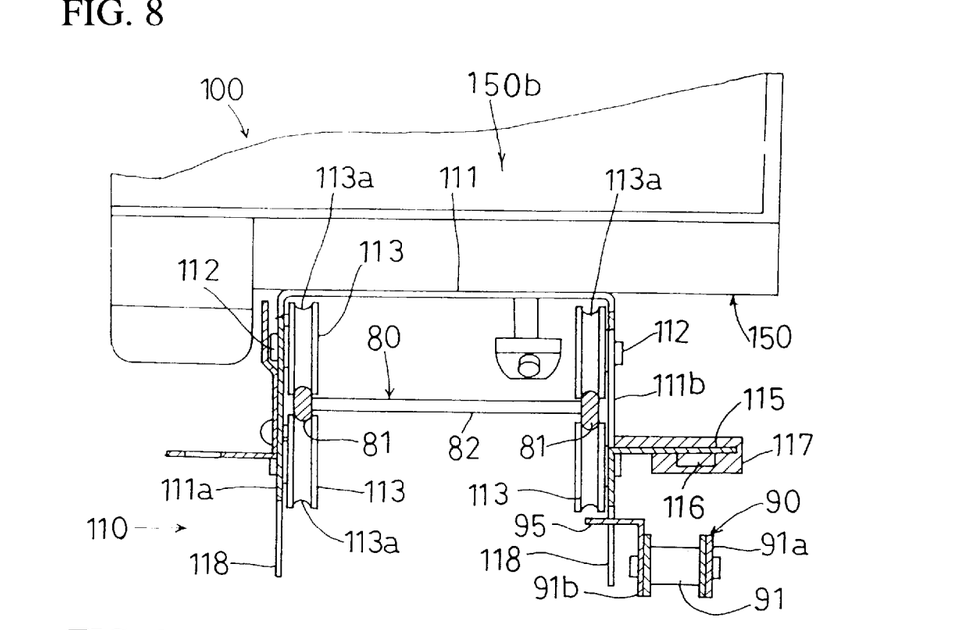
FIG. 8 is an explanatory view showing a relationship between a drive unit and a running device of a tray.
Figure 9:
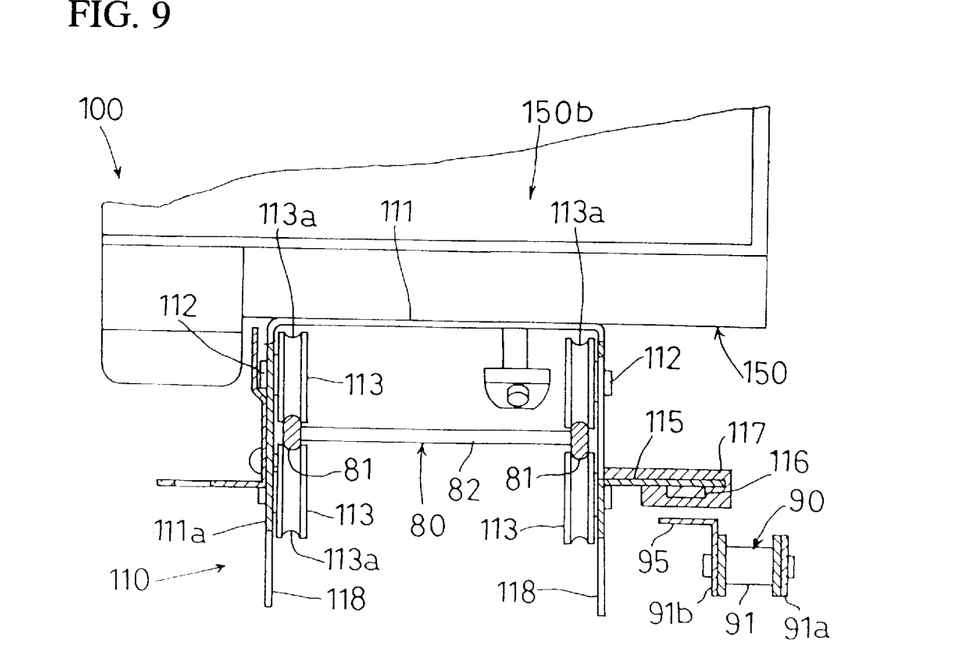
FIG. 9 is an explanatory view showing a relationship between another drive unit and the running device of the tray.

As shown in FIG. 7, the conveyer mechanism 70 is the tray conveyer type including a plurality of trays 100 driven by a drive device 90 to move along a guide circuit 80. A transport line provided by the guide circuit 80 includes a negative film intake station 71, a standby station 72, a print intake station 73 and a collating station 74. As shown in FIGS. 8 and 9, the guide circuit 80 is formed of a pair of right and left rails 81 having an approximately circular section and a connector 82 interconnecting the rails 81 with a predetermined spacing therebetween. The guide circuit 80 extends along side walls of the developing section 30 and drying section 40 and between the negative film outlet 60 disposed in a lower position of the photographic processing apparatus 1 and the print outlet 50 disposed in an upper position thereof.

Figure 10:
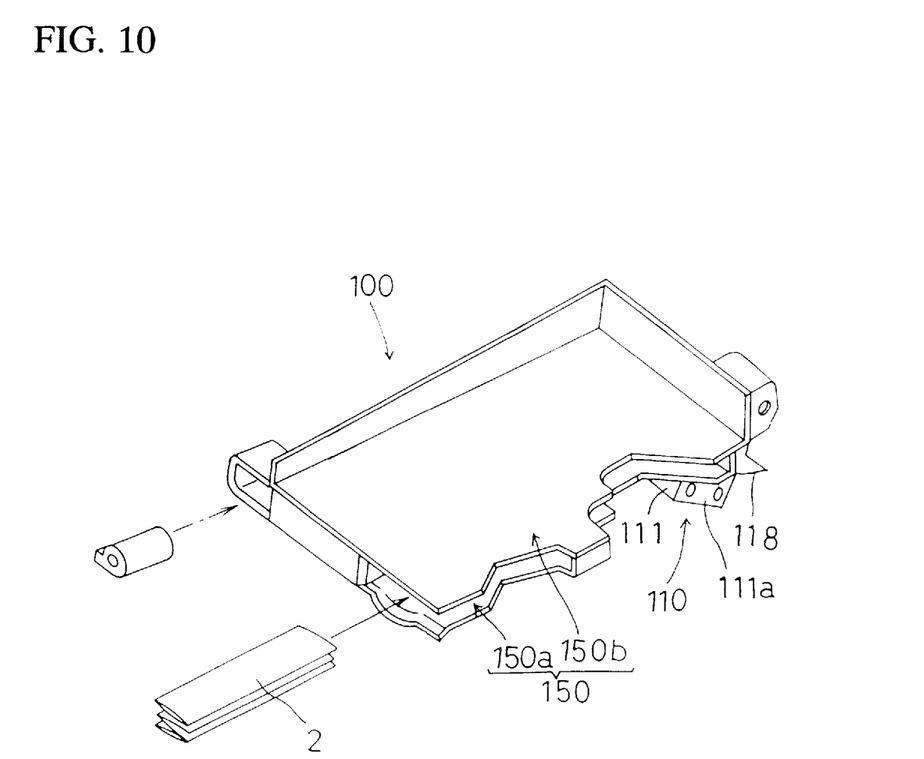
FIG. 10 is an explanatory view showing loading of negative films into a film holder.

As shown in FIGS. 8 through 10, each tray 100 includes a running device 110 for running on the rails 81, and a carrier 150 having a film holder 150a and a print holder 150b. The running device 110 has a channel-shaped running base 111, four running rollers 113 rotatably supported through axles 112 inside each of opposite side ribs 111a and 111b of the running base 111, and an angle bracket for attaching the carrier 150 to the running base 111 at an angle thereto. The eight running rollers 113 of each tray 100 have running surfaces defining grooves 113a shaped to fit on the rails 81. The running device 110 runs steadily on the rails 81, with upper and lower front running rollers 113 and upper and lower rear running rollers 113 on the right rib 111a gripping the right rail 81 in two positions thereof, and upper and lower front running rollers 113 and upper and lower rear running rollers 113 on the left rib 111a gripping the left rail 81 in two positions thereof.

At the negative film intake station 71, negative films 2 in one unit discharged from the negative film outlet 60 are transferred to the film holders 150a of trays 100. At the standby station 72, the trays 100 loaded with the negative films 2 can stand by to ensure timing to discharge from the print outlet 50 of prints 3 in the one unit having the images of negative films 2 loaded into the trays 100. At the print intake station 73, the prints 3 in the one unit on which the images of negative films 2 stored in the film holders 150a are printed are transferred from the print outlet 50 to the print holders 150b of trays 100. At the collating station 74, the negative films 2 and prints 3 in the one unit carried by the trays 100 are collated, collected from the trays and put into a product packet. Such collation and collection from each tray 100 are not synchronized with delivery of the trays 100 to the collating station 74. Thus, at the collating station 74, as at the standby station 72, the trays 100 may be stored on the rails 81. Emptied trays 100 are forward to the negative film intake station 71 again.

The trays 100 are transported by a drive device 90 of the chain drive type employing chains 91 as endless drive elements. As seen from FIG. 7, the drive device 90 is divided into a first to a sixth drive units 90a–90f. The first drive unit 90a extends between the collating station 74 and standby station 72. The second drive unit 90b is arranged to move emptied trays 100 to a tray stopping position in the negative intake station 72. The third drive unit 90c is arranged to move the trays 100 loaded with the negative films 2 to a storage line at the standby station 72 defined partly by the first drive unit 90a. The fourth drive unit 90d is arranged to move the trays 100 stored in the standby station 72 successively to a tray stopping position in the print intake station 73. As seen from FIG. 7, the fourth drive unit 90d moves the trays 100 up a steep slope. The fifth drive unit 90e moves the trays 100 additionally loaded with prints 3 down a steep slope to a portion of the first drive unit 90a forming the collating station 74. Since the guide circuit 80 is curved upstream of the collating station 74, the sixth drive unit 90f is disposed between the fifth drive unit 90e and the first drive unit 90a to move the trays 100 along the curved line. Each of the above drive units includes a chain 91, a drive sprocket 92 and direction changing sprockets 93 engaging the chain 91, and a drive motor 94 for driving the drive sprocket 92. The first, second, third and sixth drive units 90a, 90b, 90c and 90f receive power from a common drive motor 94. The fourth and fifth drive units 90d and 90e must operate intermittently in a timed way, and therefore receive power from individual drive motors 94, respectively. Each chain 91 includes not only ordinary link plate 91a but pulling link plates 91b defining hitches 95 arranged at predetermined intervals and extending axially of the rollers. Each chain 91 moves the trays 100 by means of these hitches 95.

Two types of engagement are employed for drive transmission between the hitches 95 and the running devices 110 of the trays 100. That is, to form the storage lines, the first drive unit 90a produces an engagement as shown in FIG. 9. A magnet 116 is fixed by a resin 117 to a lower surface of a mounting plate 115 extending perpendicular to and outwardly of the rib 111a of each running device 110. A magnetism acts between the magnet 116 and each hitch 95 of the chain 91 to form an engagement between the running device 110 of each tray 100 and each hitch 95 of the chain 91, whereby the chain 91 moves the tray 100. For this purpose, at least the pulling link plates 91b are formed of a magnetic substance. Thus, when the tray 100 is stopped running by a force greater than the magnetism acting between the tray 100 and chain 91, the engagement between the magnet 116 and hitch 95 is broken whereby only the chain 91 moves forward, leaving the tray 100 standing still. In this way, the trays 100 are successively stored with end surfaces of the running bases 111 contacting each other. After a preceding tray moves forward, the magnet 116 of a next tray 100 magnetically engages a hitch 95 of chain 91 again. Thus, the next tray 100 begins to be moved by the chain 91. That is, the trays 100 are stored and advanced to the position for taking out the negative films 2 and prints 3 automatically and without delay.

The drive units other than the first drive unit 90a have only to move trays 100 and chains 91 together. As shown in FIG. 8, lugs 118 extend downward from lower ends of the ribs 111a and 111b of each running base 110 to contact the hitches 95 of chain 91. As a result, an engagement is produced to transmit drive between the running device 110 and hitches 95.

The drive motors 94 are controlled by a conveyer control unit 5d of the controller 5 in a coordinated way.

At the negative film intake station 71, negative films 2 in one unit discharged from the negative film outlet 60 are transferred to the film holders 150a of trays 100. At the standby station 72, the trays 100 loaded with the negative films 2 can stand by to ensure timing to discharge from the print outlet 50 of prints 3 in the one unit having the images of negative films 2 loaded into the trays 100. At the print intake station 73, the prints 3 in the one unit on which the images of negative films 2 stored in the film holders 150a are printed are transferred from the print outlet 50 to the print holders 150b of trays 100. At the collating station 74, the negative films 2 and prints 3 in the one unit carried by the trays 100 are collated, collected from the trays and put into a product packet. Such collation and collection from each tray 100 are not synchronized with delivery of the trays 100 to the collating station 74. Thus, at the collating station 74, as at the standby station 72, the trays 100 may be stored on the rails 81. Emptied trays 100 are forward to the negative film intake station 71 again.

As seen from FIG. 4, the controller 5 performs various functions besides the functions described hereinbefore.

Figure 5:
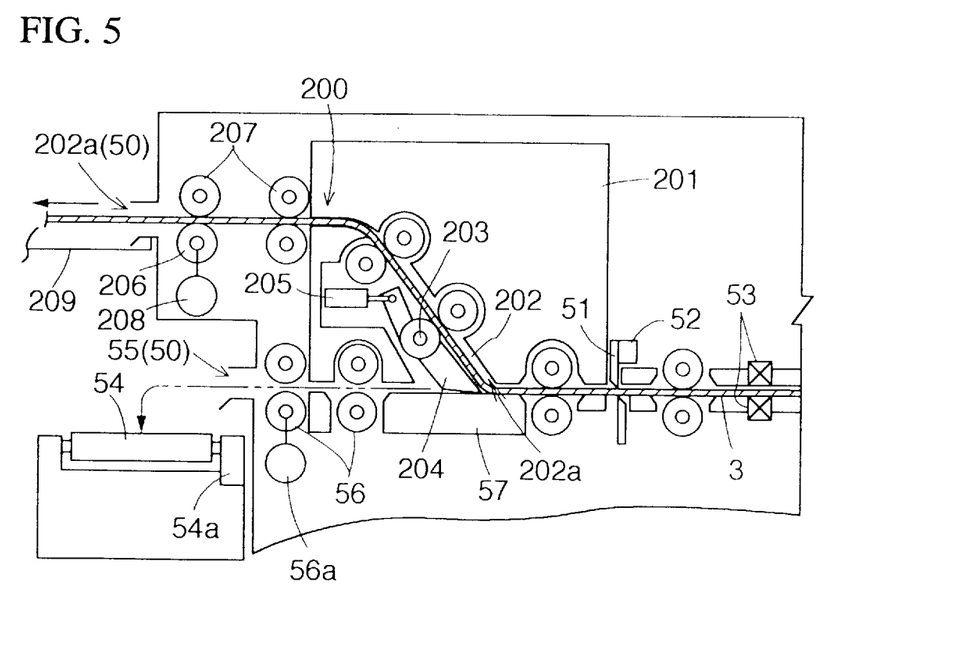
FIG. 5 is a schematic view of a discharge bypass line.

A paper cutter control unit 5e causes the motor 52 to operate the paper cutter 51 in response to the detection signal received from the notch sensor 53 upon detection of each cut notch 3a in the printing paper 3. A discharge bypass line control unit 5f causes the solenoid 205 to pivot the path switch member 204, and causes the motor 208 to rotate the drive rollers 206. As a result, the uncut printing paper 3 is shunted at the opening 202a to the through path 202 to guided to the discharge bypass line 200, instead of being forwarded to the transverse conveyer 54.

A print transport trouble detecting unit 5g cooperates with the paper transport control unit 5c and conveyer control unit 5d to detect a print transport disrupting trouble occurring in the print transport line extending from the paper cutter 51 to the collating station 74. A no-cut discharge control unit 5h is triggered by detection of a print transport disrupting trouble by the print transport trouble detecting unit 5g, to act on the paper cutter control unit 5e and discharge bypass line control unit 5f to execute a no-cut discharge process, whereby the printing paper 3 is cut only when the order notches 3b are detected, and an uncut length of printing paper 3 in each order is directed to the discharge bypass line 200. When the order notches 3b are detected after eliminating a print transport disrupting trouble, a print cutting process is executed for normal print cutting to forward cut prints 3 to the transverse conveyer 54.

Figure 11:
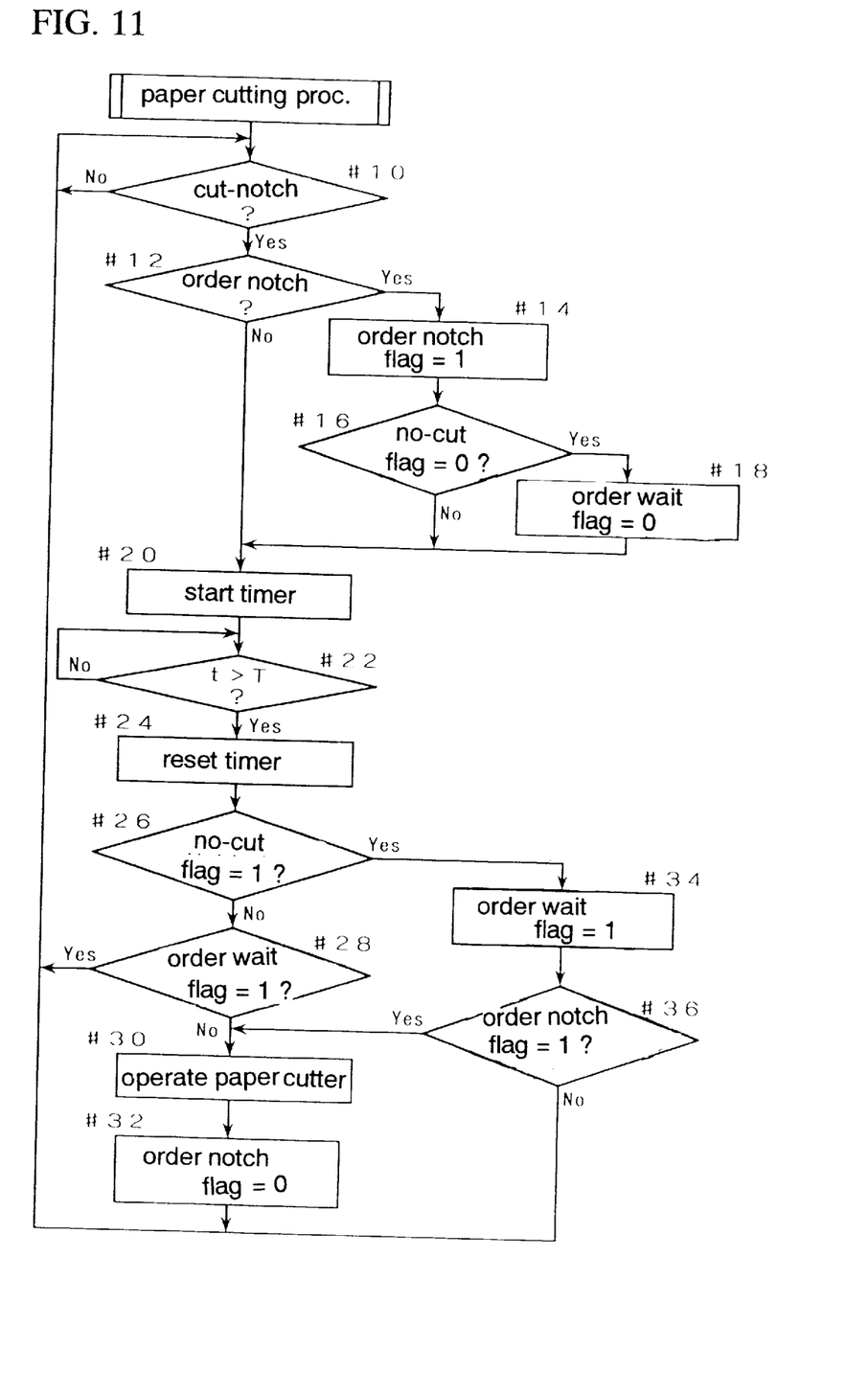
FIG. 11 is a flowchart showing operation of a paper cutter.

Operations of the paper cutter 51, in the above print cutting process, no-cut discharge process, and a switch from the no-cut discharge process to the print cutting process, will be described with reference to the flowchart of FIG. 11.

This flowchart includes two important flags. One of them is a no-cut flag to which "0" is set in time of the normal print cutting process, and "1" in time of the no-cut discharge process. The other is an order wait flag for determining timing, order by order, of switching from the no-cut discharge process to the print cutting process. When this routine is started, "0" is set to the order wait flag.

In the normal print cutting process, the operation stands by until a cut notch 3a is detected (#10). After a cut notch 3a is detected, checking is made whether an order notch 3b is detected (#12). Even if an order notch 3b is not detected, a timer is started (#20). When an order notch 3b is detected, "1" is set to an order notch flag (#14), and a state of the no-cut flag is checked (#16). Since "0" is set to the no-cut flag in time of the normal print cutting process, "0" is set to the order wait flag (#18). When time t: reaches a predetermined time: T (#22) after the timer is started (#20), a next step is taken to reset the timer (#24). The predetermined time: T corresponds to a time taken for the cut notch 3a detected by the notch sensor 53 to reach the paper cutter 51. Next, checking is made whether "1" is set to the no-cut flag (#26). In the normal print cutting process, "0" is set to the no-cut flag, and therefore the result is "No". Checking is made whether "1" is set to the order wait flag (#28). At start, "0" is set to the order wait flag, and therefore the result is "No". Thus, the paper cutter 51 is operated (#30), "0" is set to the order notch flag "0" (#32), and the operation returns to step #10. The above operation is repeated to cut prints.

The print transport trouble detecting unit 5g detects a print transport disrupting trouble, the no-cut discharge control unit 5h actuates the discharge bypass line control unit 5f and paper cutter control unit 5e to set "1" to the no-cut flag and start the no-cut discharge process.

In the no-cut discharge process, since "1" is set to the no-cut flag when only a cut notch 3a is detected, "Yes" results from step #26, "1" is set to the order wait flag (#34), and a state of the order notch flag is checked (#36). Since no order notch 3b is detected and "0" is set to the order notch flag, the result is "No" and the operation returns to step #10. That is, print cutting based on a cut notch 3a is not done.

However, if both cut notch 3a and order notch 3b are detected, "Yes" results from step #12, "1" is set to the order notch flag (#14), and a state of the no-cut flag is checked (#16). The result is "No" since "1" is set to the no-cut flag (#16). Next, the timer is started (#20). When time t: reaches the predetermined time: T (#22), the next step is taken to reset the timer (#24). The predetermined time: T corresponds to a time taken for the cut notch 3a detected by the notch sensor 53 to reach the paper cutter 51. Next, checking is made whether "1" is set to the no-cut flag (#26). The result is "Yes" since "1" is set to the no-cut flag. Then, "1" is set to the order wait flag (#34). A state of the order notch flag is checked (#36). At step #14, "1" is set to the order notch flag, and therefore "Yes" results from step #36. The paper cutter 51 is operated (#30), "0" is set to the order notch flag (#32), and the operation returns to step #10. That is, the printing paper 3 is cut order by order.

When switching from the no-cut discharge process to the print cutting process, "0" is set to the no-cut flag. When only a cut notch 3a is detected, "No" results from step #26 since "0" is set to the no-cut flag. Checking is made whether "1" is set to the order wait flag (#28). Since "1" is set to the order wait flag at step #34 as noted above, the result is "Yes", and the operation returns to step #10 without cutting prints. However, when both cut notch 3a and order notch 3b are detected in due course, "Yes" results from step #12 and from step #16, and "0" is set to the order wait flag (#18). As a result, "No" results from step #28, the paper cutter 51 is operated (#30) to cut the printing paper 3. Even when only cut notches 3a are detected thereafter, "1" remains being set to the order wait flag. Thus, "No" results from step #28, and the paper cutter 51 is operated (#30) to cut the printing paper 3.

In the embodiment described above, when uncut printing paper 3 is discharged order by order to the discharge bypass line 200. However, it is possible to employ a constructing to cut printing paper 3 otherwise, or not to cut the paper at all. It is an important aspect of this invention to discharge the printing paper 3 to the bypass line 200 without being cut in the event of a print transport disrupting trouble.

What is claimed is:

1. A photographic processing apparatus having an exposing section for printing images of negative films on printing paper, a negative film outlet for discharging the negative films used in the exposing section, a developing section for developing the printing paper printed, a paper cutter for cutting the printing paper developed, to form prints having a predetermined length, a print outlet for discharging the prints, and a collating station for collating the negative films discharged unit by unit from the negative film outlet and the prints discharged unit by unit from the print outlet, said apparatus comprising:

a discharge bypass line for forcibly discharging said printing paper;

a print transport line extending from said paper cutter to said collating station;

print transport trouble detecting means for detecting a print transport disrupting trouble occurring in said print transport line; and no-cut discharge control means, operable in response to a signal from said print transport trouble detecting means, for discharging said printing paper fed to said paper cutter to said discharge bypass line without cutting said printing paper.

2. A photographic processing apparatus as defined in claim 1, wherein said print transport line includes a tray conveyer for transporting, as one group, negative films in one unit discharged from said negative film outlet, and prints in said one unit discharged from said print outlet, said print transport trouble detecting means detecting said print transport disrupting trouble based on an interruption of transport by said tray conveyer.

3. A photographic processing apparatus as defined in claim 1, wherein said discharge bypass line is disposed downstream of said paper cutter with respect to a direction of transport.

4. A photographic processing apparatus as defined in claim 3, wherein said printing paper defines cut notches dividing each frame image, and order notches dividing each order, said no-cut discharge control means being operable to permit cutting of said printing paper fed to said discharge bypass line when said order notches are detected.

5. A photographic processing apparatus as defined in claim 4, wherein said no-cut discharge control means is operable to switch from a no-cut discharge process to a print cutting process when said order notches are detected.

6. A photographic processing apparatus as defined in claim 3, wherein said printing paper defines cut notches dividing each frame image, and order notches dividing each order, said no-cut discharge control means being operable to switch from a no-cut discharge process to a print cutting process when said order notches are detected.

* * * * *